July 31, 1923.
B. F. WALKER
VEHICLE WHEEL
Filed March 17, 1921
1,463,640
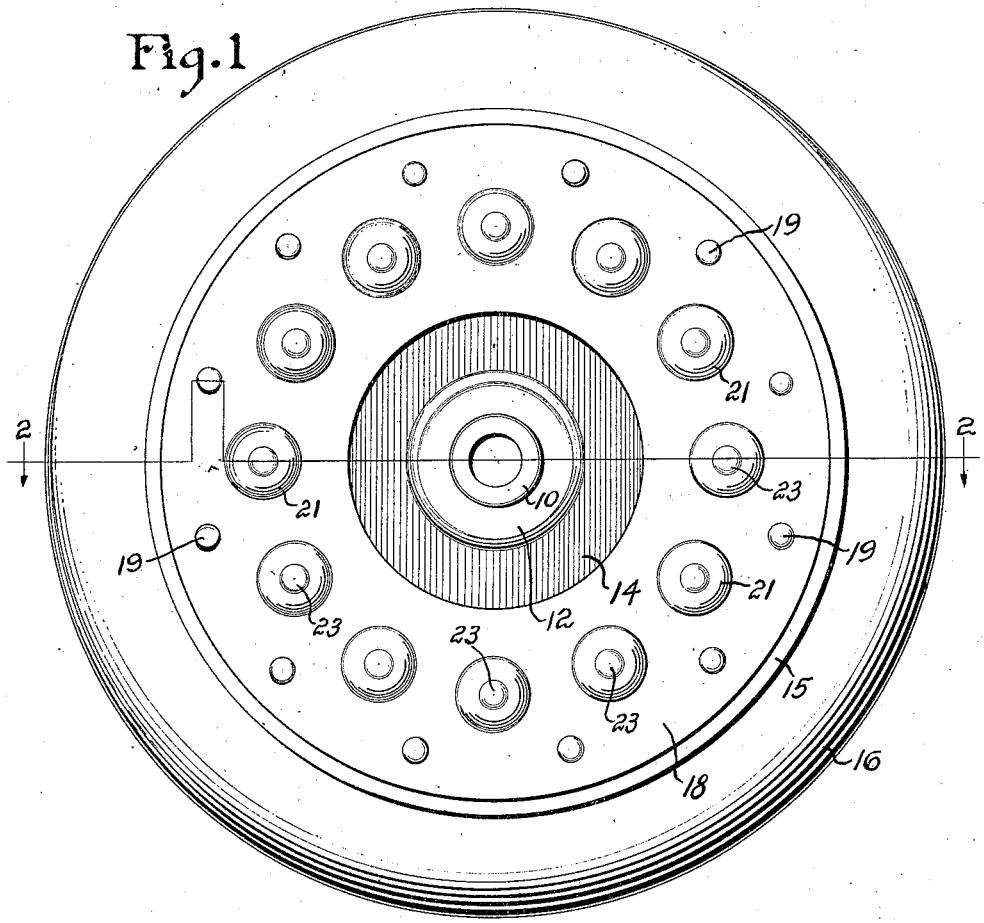
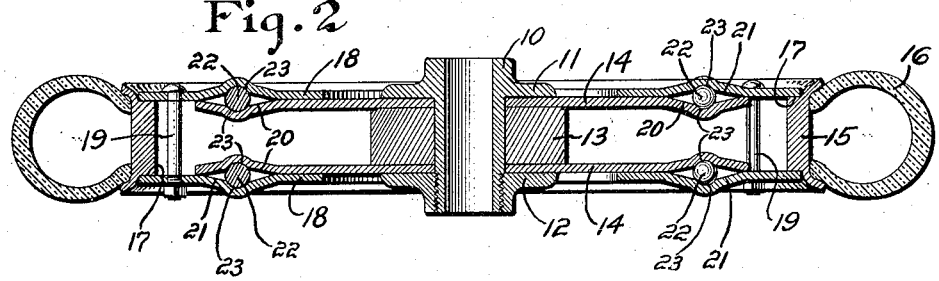
INVENTOR
Benjamin F. Walker
BY
A. M. Wooster
ATTORNEY Patented July 31, 1923.

1,463,640

UNITED STATES PATENT OFFICE.

BENJAMIN F. WALKER, OF BRIDGEPORT, CONNECTICUT.

VEHICLE WHEEL.

Application filed March 17, 1921. Serial No. 452,916.

*To all whom it may concern:*

Be it known that I, BENJAMIN F. WALKER, a citizen of the United States, residing at Bridgeport, county of Fairfield, State of Connecticut, have invented an Improvement in Vehicle Wheels, of which the following is a specification.

This invention relates to vehicle wheels and has for its object to provide a yielding wheel which will absorb abnormal shocks without transmitting the same to the vehicle and which will automatically react so as to recover or right itself after a shock without exerting a violent reaction upon the vehicle, as distinguished from the resilient devices usually employed in spring and similar wheels in which the reaction or rebound transmitted to the vehicle is nearly, if not quite, as violent as the original shock itself.

With the foregoing and other objects in view, I have devised the novel vehicle wheel which I will now describe, reference being had to the accompanying drawings, in which:

Fig. 1 is a side elevation of the wheel, and

Fig. 2 is a horizontal section taken substantially on the line 2—2, Fig. 1.

10 denotes a hub having fixed and removable flanges 11 and 12 respectively, and 13 an annular spacing block between which and the flanges 11 and 12 are clamped the central portions of a pair of circular plates or discs 14, preferably composed of steel or other resilient metal. 15 denotes a rim which carries a tire 16 of any suitable character, said rim having shoulders 17 which receive the outer edges of a pair of annular plates or rings 18 connected with one another and clamped against the shoulders 17 by means of cross bolts 19, said plates or rings 18 being preferably also composed of resilient material similar to that of the plates or discs 14.

The plates 18 overlap the plates 14, and each is formed on its face adjacent the corresponding plate 14 with a series of relatively flat, substantially conical recesses or pockets 21 disposed respectively opposite similar recesses or pockets 20 formed in the adjacent face of the plate 14. Disposed between the plates 14 and 18, in the spaces afforded by the opposed recesses 20 and 21 therein, is a series of retaining members, preferably in the form of balls 22, said recesses 20 and 21 having, at their apexes, substantially spherical sockets 23 in which said balls are normally seated.

It will be seen that the wheel comprises two relatively movable portions, namely, a central portion comprising the hub 10, spacing block 13, and inner plates or discs 14, and a peripheral portion comprising the rim 15 and outer plates or rings 18. These two wheel portions are normally rigidly connected by the balls 22, the connection being such that it will, under normal conditions, support the weight of the vehicle and withstand minor jars without permitting relative movement of said wheel portions. In the event of an abnormal shock, however, this connection will yield to permit a relative movement of said portions in the direction of said shock, the plates springing slightly to permit the balls 22 to be unseated from the sockets 23. By reason of the conical shape of the recesses or pockets 20 and 21, the balls 22 will thereafter tend to gravitate back into said sockets and thereby return the parts to normal condition, this action being assisted by the weight of the vehicle when the wheel is turned to bring uppermost that part of the peripheral portion which, under the influence of the shock, has been forced radially inward with respect to the central portion. In any event, however, it will be seen that the recovery of the wheel to normal condition is a relatively gentle and gradual one which will produce no considerable reactive effect upon the vehicle.

Having thus described my invention, I claim:

1. A vehicle wheel comprising overlapping central and peripheral portions movable relative to each other and provided respectively with opposed oppositely disposed substantially conical recesses having sockets at the apexes thereof, and retaining members in said sockets.

2. A vehicle wheel comprising overlapping central and peripheral portions movable relative to each other and provided respectively with opposed oppositely disposed, substantially conical recesses having sockets at the apexes thereof, and balls located in said sockets.

3. A vehicle wheel having central and peripheral portions comprising overlapping plates one of which is resilient, said plates being provided respectively with opposed, oppositely disposed, substantially conical recesses having sockets at the apexes thereof, and retaining members in said sockets.

4. A vehicle wheel having central and peripheral portions comprising overlapping plates one of which is resilient, said plates being provided respectively with opposed, oppositely disposed, recesses having inclined walls and a socket having curved walls leading into the recesses, and balls seated in said sockets.

5. A vehicle wheel comprising overlapping central and peripheral portions movable relative to each other and provided respectively with opposed oppositely disposed recesses having sockets, and retaining members in said recesses and normally seated in said sockets.

6. A vehicle wheel comprising overlapping central and peripheral portions movable relative to each other and provided respectively with opposed oppositely disposed, substantially conical recesses having sockets, and balls located in said recesses and normally seated in said sockets.

7. A vehicle wheel having central and peripheral portions comprising overlapping resilient plates provided respectively with opposed oppositely disposed, substantially conical recesses having sockets, and balls located in said recesses and normally seated in said sockets.

8. A vehicle wheel comprising a hub, a pair of spaced discs carried by said hub, a rim, a pair of rings carried by said rim and overlapping said discs, said discs and rings being provided respectively with oppositely disposed, substantially conical recesses having sockets, and balls located in said recesses and normally seated in said sockets.

9. A vehicle wheel comprising a hub, a pair of spaced resilient discs carried by said hub, a rim, a pair of resilient rings carried by said rim and overlapping said discs, said discs and rings being provided respectively with oppositely disposed, substantially conical recesses having sockets, and balls located in said recesses and normally seated in said sockets.

10. A vehicle wheel having central and peripheral portions comprising overlapping resilient plates provided respectively with opposed, oppositely disposed, substantially conical recesses having sockets at the apexes thereof, and retaining members in said sockets.

11. A vehicle wheel having central and peripheral portions comprising overlapping resilient plates provided respectively with opposed, oppositely disposed, substantially conical recesses having sockets at the apexes thereof, and balls located in said sockets.

12. A vehicle wheel having central and peripheral portions comprising overlapping resilient plates provided respectively with opposed, oppositely disposed recesses having inclined walls and a socket having curved walls, and balls normally seated in and fitting said sockets to provide a normally rigid, yielding connection between the overlapping plates.

In testimony whereof I affix my signature.

BENJAMIN F. WALKER.